United States Patent
Guo et al.

(10) Patent No.: US 9,635,254 B2
(45) Date of Patent: Apr. 25, 2017

(54) PANORAMIC SCENE CAPTURING AND BROWSING MOBILE DEVICE, SYSTEM AND METHOD

(71) Applicants: INVENTEC APPLIANCES (PUDONG) CORPORATION, Shanghai (CN); INVENTEC APPLIANCES (SHANGHAI) CO. LTD, Shanghai (CN); INVENTEC APPLIANCES (NANCHANG) CORPORATION, Jiangxi (CN); INVENTEC APPLIANCES CORP., New Taipei (TW)

(72) Inventors: Houjin Guo, Jiangxi (CN); Ju-Nan Chang, New Taipei (TW); Ching Sung Chang, New Taipei (TW)

(73) Assignees: INVENTEC APPLIANCES (PUDONG) CORPORATION, Shanghai (CN); INVENTEC APPLIANCES (SHANGHAI) CO. LTD., Shanghai (CN); INVENTEC APPLIANCES (NANCHANG) CORPORATION, Jiangxi (CN); INVENTEC APPLIANCES CORP., New Taipei (TW)

( * ) Notice: Subject to any disclaimer, the term of this patent is extended or adjusted under 35 U.S.C. 154(b) by 235 days.

(21) Appl. No.: 14/502,143

(22) Filed: Sep. 30, 2014

(65) Prior Publication Data
US 2015/0271402 A1 Sep. 24, 2015

(30) Foreign Application Priority Data

Mar. 21, 2014 (CN) .......................... 2014 1 0108443

(51) Int. Cl.
  H04N 7/18 (2006.01)
  H04N 5/232 (2006.01)
(52) U.S. Cl.
  CPC ..... H04N 5/23238 (2013.01); H04N 5/23293 (2013.01)
(58) Field of Classification Search
  CPC .................................................. G02B 27/017
  (Continued)

(56) References Cited

U.S. PATENT DOCUMENTS

2012/0075168 A1* 3/2012 Osterhout ............ G02B 27/017
  345/8
2012/0127284 A1* 5/2012 Bar-Zeev ............. G02B 27/017
  348/53

FOREIGN PATENT DOCUMENTS

CN 201773251 3/2011

* cited by examiner

Primary Examiner — Andy Rao
(74) Attorney, Agent, or Firm — Muncy, Geissler, Olds & Lowe, P.C.

(57) ABSTRACT

A panoramic scene capturing and browsing system includes a panoramic scene capturing device and a mobile device. The headset panoramic scene capturing device in communication with the mobile device by point to point data transmission, whereby the user can instantly view each image capturing screen via the mobile device from headset panoramic scene capturing device, then control the headset panoramic scene capturing device to capture the panoramic scene. Other hand, the present invention utilizes a mobile device contained accelerometers and gyroscopes to detect the status of a mobile device, and corresponding to the panoramic scene position, to increase the panoramic scene reality feeling and to enhance the experience of user.

20 Claims, 9 Drawing Sheets

PANORAMIC SCENE CAPTURING AND BROWSING MOBILE DEVICE, SYSTEM AND METHOD

FIELD OF THE INVENTION

The present invention relates to a panoramic scene capturing and browsing system, and in particular to a panoramic scene capturing and browsing system, method and the device associated with a headset panoramic scene capturing device.

BACKGROUND OF THE INVENTION

Due to 3C product is developed day by day, the current digital cameras and camera phones has become a necessity of life. In order to attract consumers, these digital camera or camera phone manufacturers are all committed to develop the camera function of digital camera and camera phones. Currently, a digital camera or camera phone function has been extended so-called 360 degree panoramic mode.

The currently known implementation of 360 degree panoramic camera mode is enabled according to the viewing angle range to obtain a viewing angle amount of movement and is moved along a predetermined plane to rotate the photography device on the digital camera or mobile phone in a clockwise or counter-clockwise to capture the plurality of images in different directions according to the amount of movement. The left and right or up and down at both sides of the plurality of images and the previous image or the after image include an overlapping region. To compare the overlapping region and to process with the images superimposed to compose a panoramic scene with a 360 degree viewing angle.

FIG. 1 is a schematic view of showing a conventional panoramic scene capturing method. Generally, the photography device 12 such as a digital camera or camera phone is capable of composing the plurality of images to generate a panoramic scene. User 10 utilizes the photography device 12 to capture the image in accordance with a predetermined plane along a certain movement speed in a clockwise or counter-clockwise rotation, that is, the image in each direction of the panoramic scene is to be captured. Then, the photography device 12 utilizes the image process function therein to compose the image in each direction to generate a panoramic scene. Nevertheless, above capturing method shall be taken in the same way because the photography device 12 is moved at a different direction to capture the images in different directions, and the movement speed of the photography device 12 is uneven, and the photography device 12 is shaken when the people or the objects moved during the shooting process, the captured image in each direction is poor so as to the panoramic scene cannot be composed or the captured image quality is poor after the panoramic scene is composed.

In order to overcome aforementioned drawbacks, the CN Publication Application No. 201773251 disclosed a panoramic scene capturing method which utilizes a base with 360 degree constant rotation speed to fix the photography device 12 thereon such that the photography device 12 can shoot along a predetermined plane in a clockwise or counter-clockwise rotation to prevent the uneven rotation speed or shaking. However, the base with constant rotation speed needs to install a tripod for operating. In addition, for the capturing viewing angle range and the relevant functional specifications of the photography device 12, the stepper motor of the base with constant rotation speed needs to set different motor speeds, but the operation is not convenient for the user.

When the user 10 browses the composed panoramic scene with 360 degree viewing angle on the built-in display unit and browsing mode in the photography device 12, the steps of the browsing method includes: user 10 utilizes the mode button or the touch panel on the photography device 12 to control the panoramic scene to move to the left or right, so as to the user can browse each viewing angle range of the panoramic scene. However, the direction change operation of the viewing angle of the photography device 12 is not convenient for operating the aforementioned image browsing method. For example, when the user clicks the left arrow button to move the viewing angle to the left region for browsing, the behavior of click the left arrow button is to be defined as the center of the viewing angle that is moved to the left direction, such that the current perspective of the viewing region is turned into the right region to allow the user 10 cannot intuitively browse panoramic scene.

SUMMARY OF THE INVENTION

An objective of the present invention is to provide a headset panoramic scene capturing and browsing system and a panoramic scene reality feeling browsing method. The headset panoramic scene capturing device includes a plurality of camera lenses which is used as a panoramic scene capturing device for transmitting the image data to a mobile device comprises a panoramic scene viewing application program to achieve the panoramic scene reality feeling browsing. As a result, the drawbacks for the digital camera or camera phone utilizes the rotary framing for capturing the panoramic scene and the screen image cannot controlled to browse directly when the user browses the panoramic scene are to be overcome respectively.

To realize the above objective, the present invention provides a mobile device with a panoramic scene capturing and browsing function that applied to connecting a photography device. The mobile device includes a touch and display screen module, a central processing module, a memory module, and a motion detecting module. The touch and display screen module. The central processing module and the memory module are electrically connected via a transmission interface, and the motion detecting module is electrically connected with the central processing module. The motion detecting module is provided for detecting the status of the mobile device. The central processing module is provided for executing an application in the memory module and for generating a composed panoramic scene according to a plurality of partial images is captured by the photography device corresponding to the positioning data of the plurality of partial images respectively. According to mobile device status, the central processing module also controls the composed panoramic scene that displayed in the range of viewing angle on the touch and display screen module.

According to one embodiment of the present invention, the photography device includes a plurality of camera lenses.

According to one embodiment of the present invention, the plurality of camera lenses is disposed in the same horizontal plane or on the same spherical surface and is fixed in the carrier adapted to human head.

According to one embodiment of the present invention, the photography device further includes a processing unit for generating a positioning data corresponding to the plurality of partial images and the positioning data includes a viewing angle range of capturing the plurality of partial images.

According to one embodiment of the present invention, the browsing viewing angle range of the composed panoramic scene on the touch and display screen module is equal to or smaller than the viewing angle range of capturing the plurality of partial images.

According to one embodiment of the present invention, the mobile device further includes a wireless communication module. The wireless communication module is in communicated with the photography device by the wireless communication and the wireless communication is in compliance with Bluetooth, Bluetooth Low Energy, Wi-Fi (Wireless Fidelity) or 3G (Third Generation) mobile communication protocol.

According to one embodiment of the present invention, the motion detecting module at least includes an accelerometer, a gravity meter and a gyroscope and the status of the mobile device includes acceleration variation, angular velocity variation or X-axis, Y-axis, and Z-axis of gravity gradient variation.

The objective of the present invention is to provide a panoramic scene capturing and browsing system, which includes a photography device that includes a plurality of camera lenses that is provided for capturing a plurality of partial images and the photography device that is provided for generating a positioning data corresponding to the plurality of partial images. A mobile device at least includes a motion detecting module and is communicated with the photography device for controlling the photography device. The motion detecting module is provided for detecting a state of the mobile device, in which the mobile device is provided for receiving the plurality of partial images and the positioning data. The mobile device further generates a composed panoramic scene according to the plurality of partial images and the positioning data. The viewing angle range for browsing the composed panoramic scene on the mobile device is controlled according to the state of the mobile device.

According to one embodiment of the present invention, the plurality of camera lenses is disposed in the same horizontal plane and is fixed in the carrier adapted to human head.

According to one embodiment of the present invention, the positioning data at least includes a viewing angle range of capturing the plurality of partial images.

According to one embodiment of the present invention, the viewing angle range of browsing for the composed panoramic scene on the mobile device is equal to or smaller than the viewing angle range of capturing the plurality of partial images.

According to one embodiment of the present invention, the viewing angle range of browsing for the composed panoramic scene on the mobile device is in a range from 60 degree to 220 degree.

According to one embodiment of the present invention, the viewing angle range of browsing for the composed panoramic scene on the mobile device is in a range from 60 degree to 120 degree.

According to one embodiment of the present invention, the motion detecting module at least includes an accelerometer, a gravity meter and a gyroscope and the state of the mobile device includes acceleration variation, angular velocity variation or X-axis, Y-axis, and Z-axis of gravity gradient variation.

According to one embodiment of the present invention, the mobile device is communicated with the photography device by wireless communication.

According to one embodiment of the present invention, the wireless communication is in compliance with Bluetooth, Bluetooth Low Energy, Wi-Fi (Wireless Fidelity) or 3G (Third Generation) mobile communication protocol.

According to one embodiment of the present invention, the photography device is disposed on the same spherical surface and is fixed in the carrier adapted to human head.

The present invention also provides a panoramic scene capturing and browsing method, which includes (a) capturing a plurality of images corresponding to different directions and obtaining a positioning data corresponding to the plurality of images; (b) composing the plurality of images to generate a composed panoramic scene according to the positioning data corresponding to the plurality of images; (c) displaying the composed panoramic scene on the mobile device and displaying a viewing angle range of browsing for the composed panoramic scene in different directions according to the state of the mobile device.

According to one embodiment of the present invention, the capturing method includes a plurality of images that is captured corresponding to different directions by the plurality of camera lenses.

According to one embodiment of the present invention, panoramic scene capturing and browsing method further transfers an image and viewing angle range of browsing to the mobile device.

According to aforementioned aspects, the panoramic scene capturing system of the present invention is lightweight and easy to carry. Unlike the conventional method, the panoramic scene is photographed by hand moving mounted device. The present invention provides a plurality of camera lenses for capturing the plurality of partial images in different directions at the same time and for composing the panoramic scene so that the operation threshold is to be reduced and the quality of the panoramic scene is to be increased.

For browsing 360 degree panoramic scene, the panoramic scene browsing method of the present invention utilizes the motion detecting module of the mobile device to detect the moving angle of the mobile device and to control the viewing angle range for the panoramic scene to allow the intuitive operation to reach the panoramic scene intuitive feelings and to enhance the reality feeling.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

According to the drawings, the present invention provides a specific embodiment for panoramic scene capturing, browsing system and method which is described in further detail. Since the present invention discloses a panoramic scene capturing and browsing system, some electronic circuit module or components is achieved by using the embodiment of the present invention. Thus, it will not be described completely in the following description. In the following detailed description of the preferred embodiments, reference is made to the accompanying drawings which form a part hereof, and as shown by way of illustration specific embodiments in which the invention may be practiced.

Figure 1:
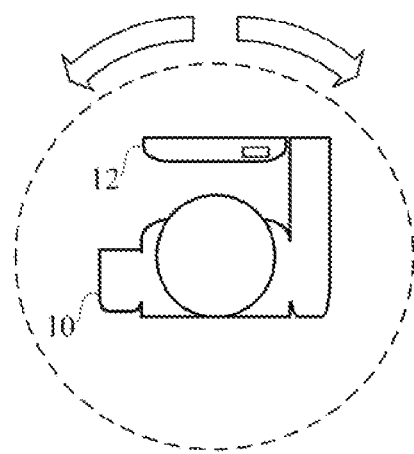
FIG. 1 is a schematic view of showing a conventional panoramic scene capturing method in accordance with the conventional prior art.
Figure 2:
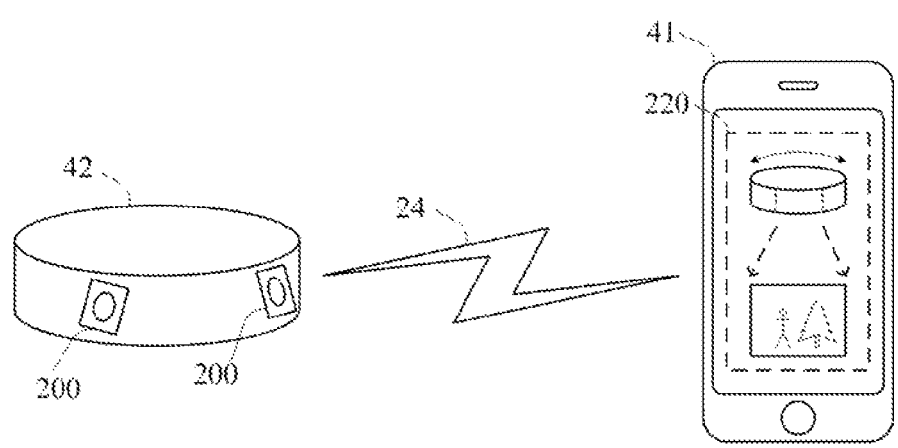
FIG. 2 is a schematic view of showing a panoramic scene capturing device for photographing the panoramic scene and browsing by the mobile device in accordance with present invention.
Figure 5:
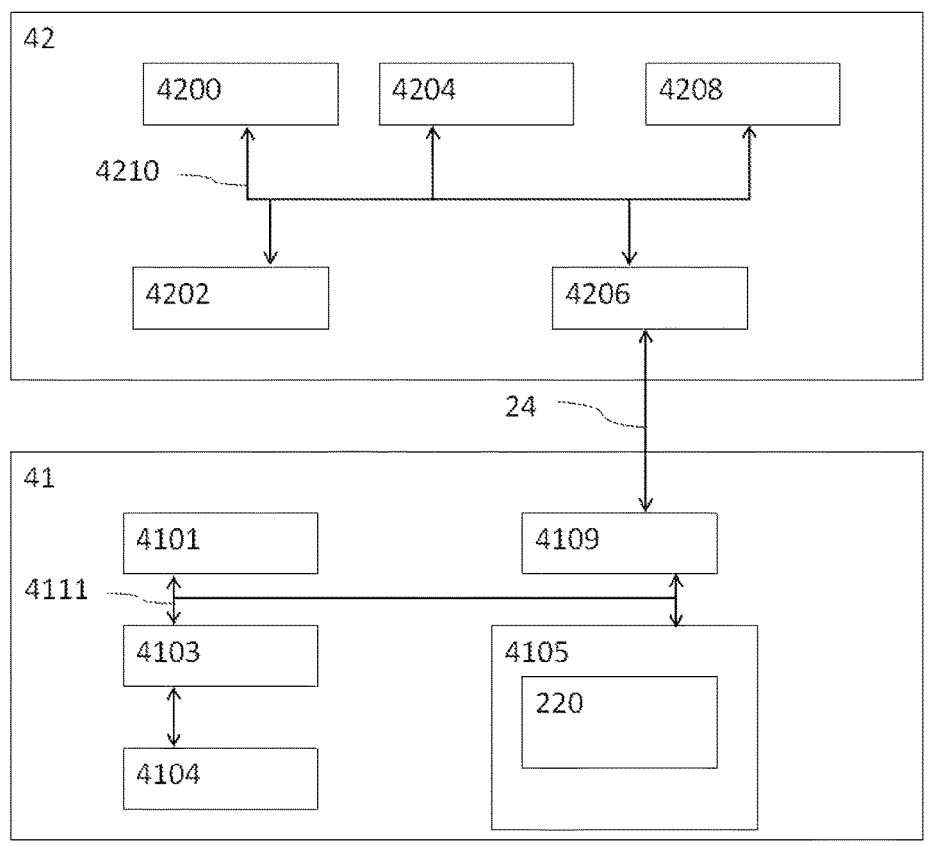
FIG. 5 is a schematic view of showing a panoramic scene capturing and browsing system in accordance with the present invention.

Please refer to FIG. 2 and FIG. 5. FIG. 2 and FIG. 5 are schematic views of showing the panoramic scene capturing and browsing system respectively. The panoramic scene capturing and browsing system includes a panoramic scene capturing device 42 and a mobile device 41, in which the mobile device 41 at least includes a motion detecting module 4107 that is in communicated with the panoramic scene capturing device 42 via a communication 24. The panoramic scene capturing device 42 includes a plurality of camera lenses 200 for capturing the plurality of partial images of a panoramic scene and the panoramic scene capturing device 42 is provided for loading the positioning data corresponding to the plurality of partial images. The mobile device 41 controls the panoramic scene capturing device 42 through the communication 24 and the motion detecting module 4107 that is provided for detecting the state of the mobile device 41. The mobile device 41 controls the plurality of camera lenses of the panoramic scene capturing device 42 to capture a plurality of partial images of the panoramic scene and to transfer the plurality of partial images of the panoramic scene and the positioning data to the mobile device 41. The mobile device 41 further composes the panoramic scene according to the positioning data of the plurality of the partial images of the panoramic scene to generate a composed panoramic scene for displaying on the mobile device 41. In addition, the mobile device 41 controls a viewing angle range of browsing of the panoramic scene on the mobile device according to the detected state of the mobile device 41. In this embodiment, the mobile device 41 can be the mobile phone, Smartphone, PDA (personal digital assistant) or notebook, and the types of the mobile device 41 is not to limit herein.

Please still refer to FIG. 2 and FIG. 5. The present invention utilizes the panoramic scene capturing device for capturing the panoramic scene and the mobile device 41 for operating the panoramic scene browsing. As shown in FIG. 2, the present invention utilizes the panoramic scene capturing device 42 that is associated with the mobile device 41 to perform a panoramic scene capturing and browsing, in which the panoramic scene capturing device 42 is a carrier adapted to a human head and the panoramic scene capturing device 42 is in communicated with the mobile device 41 via a communication 24 so as to construct a panoramic scene capturing and browsing system 40. The panoramic scene capturing device 42 integrates with a plurality of camera lenses 200 and of the plurality of camera lenses 200 is arranged on carrier according to the viewing angle range is to be captured by each the plurality of camera lenses 200, such that the plurality of camera lenses is disposed adjacent to each other to partially overlap at the edge of the viewing angle. The plurality of partial images is captured by the headset panoramic scene capturing device 42 and the plurality of partial images is transferred to the mobile device 41 via the communication 24. The mobile device 41 is equipped with an application 220 with the functions of panoramic scene generation and the panoramic scene reality feeling browsing to enable the objective of the headset panoramic scene capturing device 42 and the mobile device 41 is used for the panoramic scene capturing and panoramic scene reality feeling browsing.

Figure 3:
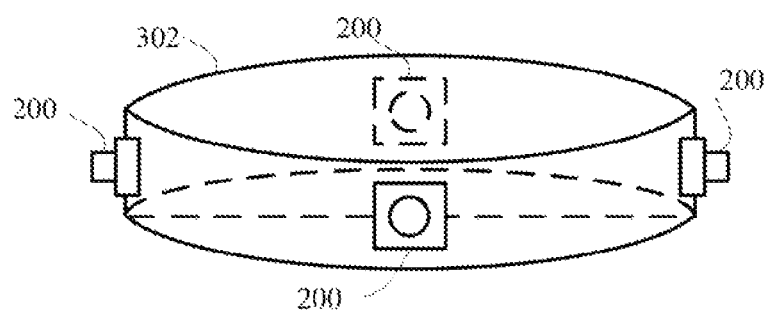
FIG. 3 is a schematic view of showing a panoramic scene capturing device of a panoramic scene capturing and browsing system of the first embodiment in accordance with the present invention.

Please refer to FIG. 3. FIG. 3 is a schematic view of the panoramic scene capturing device 42 which is used for panoramic scene capturing and browsing system. As shown in FIG. 3, the panoramic scene capturing device 42 includes a plurality of camera lenses 200 which is fixed on a carrier 302 adapted to a human head. Obviously, the plurality of camera lenses is disposed on the same horizontal plane and is faced to at least four different directions respectively. In this embodiment, the plurality of camera lenses 200 can be the standard lens, wide-angle lens or fisheye lens.

Figure 4:
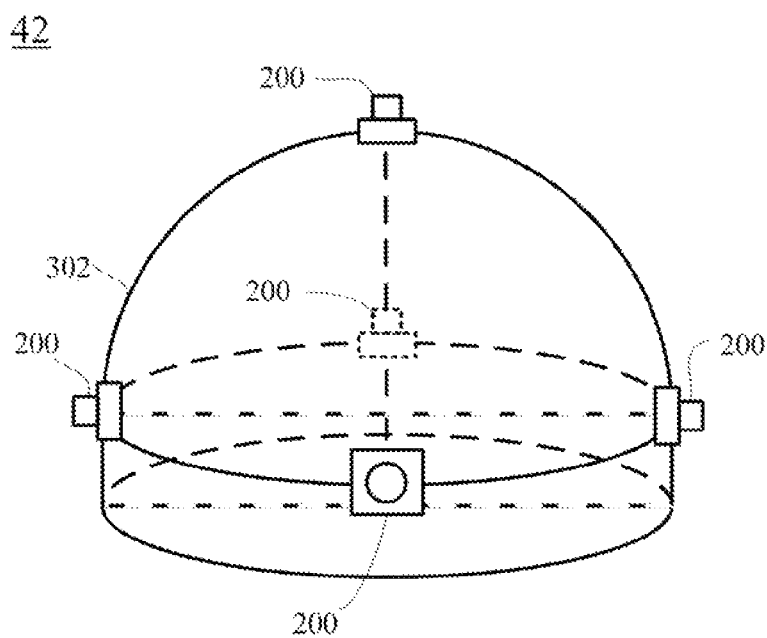
FIG. 4 is a schematic view of showing a panoramic scene capturing device of a panoramic scene capturing and browsing system of the second embodiment in accordance with the present invention.

Please refer to FIG. 4. FIG. 4 is a schematic view of the second embodiment of the panoramic scene capturing device of the panoramic scene capturing and browsing system. As shown in FIG. 4, in one embodiment, the panoramic scene capturing device 42 further includes other camera lenses 200, in which the plurality of the camera lenses is disposed in the same sphere plane as shown in FIG. 3. In another embodiment, the plurality of camera lenses 200 can fix on a carrier 302 adapted to a human head. According to aforementioned, the amount of the camera lenses of the panoramic scene capturing device 42 are not limited in this embodiment.

Please refer to FIG. 5. FIG. 5 is a schematic view of showing a panoramic scene capturing and browsing system. As shown in FIG. 5, the panoramic scene capturing and browsing system 40 is constructed by a panoramic scene capturing device 42 and a mobile device 41. The panoramic scene capturing device 42 includes a photography unit 4200, a processing unit 4202, a storage unit 4204, a wireless communication unit 4206, a power supply unit 4208 and a control communication interface 4210. The mobile device 41 includes a touch and display screen module 4101, a central processing module 4103, a memory module 4105, a motion detecting module 4107, a wireless communication module 4109 and a transmission interface 4111. As for the communication between the panoramic scene capturing device 42 and the mobile device 41, and the connection between each component respectively in the panoramic scene capturing device 42 and the mobile device 41 are described in the following.

For the panoramic scene capturing device 42, the photography unit 4200, the processing unit 4202, the power supply unit 4208 and the wireless communication unit 4206 are communicated with each other by a transmission interface 4210. The power supply unit 4208 is further electrically connected with an external power supply (not shown) and the external power supply is used for providing the required power for the panoramic scene capturing device 42 through the power supply unit 4208. In one embodiment, the viewing angle range of left and right for the photography unit 4200 is in a range from 60 degree to 220 degree, and the view angle range of up and down is in a range from 60 degree to 120 degree. The photography unit 4200 utilizes the processing unit 4202 to control the photo operation mode. The plurality of partial captured images is captured by the photography unit 4200 that is converted into a digital image data by an internal analog-to-digital converter (not shown) and the digital image data is to be stored in the storage unit 4204. Furthermore, it is noted to illustrate that the photography unit 4200 of FIG. 5 can include the plurality of camera lenses as shown in FIG. 3 and FIG. 4. The photography unit 4200 is associated with each the plurality of camera lenses 200 to capture the different plurality of partial images for the viewing angle range of capturing different partial of the panoramic scene.

The mobile device 41 and the panoramic scene capturing device 42 is communicated by the communication 24 between the wireless communication module 4109 of the mobile device 41 and the wireless communication unit 4206. In one embodiment, the communication 24 between the wireless communication unit 4206 and the wireless communication module 4109 is in compliance with Bluetooth, Bluetooth Low Energy, Wi-Fi (Wireless Fidelity) or 3G (Third Generation) mobile communication protocol. The central processing module 4103 of the mobile device 41 transmits a control instruction through the wireless communication module 4109 of the mobile device 41 to the panoramic scene capturing device 42, and the control instruction is received by the wireless communication unit 4206 of the panoramic scene capturing device 42 and is transmitted to the processing unit 4202 to further control the implementation of the video surveillance, the video recording or the video recording of a specific viewing angle range for the photography unit 4200. After the plurality of partial images is captured by the plurality of camera lenses 200 of the panoramic scene capturing device 42, the plurality of partial images is composed to generate a panoramic scene that is to be fully linked to display on the mobile device 41, and when the plurality of partial images is captured by the plurality of camera lenses, the positioning data must be embedded in each digital image data which is converted by the plurality of partial images, that is, the orientation of the plurality of partial captured images and the viewing angle range data are loaded for the panoramic scene capturing device 42 respectively. The detail operation of the panoramic scene capturing device 42 embedded the positioning data that is to be described in the following panoramic scene capturing and browsing method.

The storage unit 4204 is an electronic component having a storage function, for example, the flash memory. The storage unit 4204 is provided for storing the data of the plurality of partial images which is captured by the photography unit 4200 and storing the required operating program of the processing unit 4202. The operating program such as an initialization program, an image positioning data and the pre-processing program of the viewing angle range of capturing data. The wireless communication unit 4206 and the wireless communication module 4109 allow the communication between panoramic scene capturing device 42 and the mobile device 41 and transmit the data to each other. For example, the wireless communication unit 4206 receives the control instruction which is transmitted by the central processing unit 4103 wireless from the communication module 4109 of the mobile device 41, or the wireless communication unit 4206 communicates the image data of the storage unit 4204 to the wireless communication module 4109. The wireless communication unit 4206 is wireless communicated with the wireless communication module 4109. In one embodiment, the communication 24 between the wireless communication unit 4206 and the wireless communication module 4109 is in compliance with Bluetooth, Bluetooth Low Energy, Wi-Fi (Wireless Fidelity) or 3G (third Generation) mobile communication protocol.

FIG. 5 shows the power supply unit 4208 that is provided for the required power for operating the panoramic scene capturing device 42, and the operation mode can includes normal operation mode, energy saving mode and the standby mode. For the normal operation mode, the power supply unit 4208 provides the power supply for the photography unit 4200, the processing unit 4202, the storage unit 4204 and the wireless communication unit 4206 to allow the panoramic scene capturing device 42 to capture the plurality of partial images. For the energy saving mode, the power supply unit 4208 provides the power to the processing unit 4202, the wireless communication unit 4206 and alternatively provides the power to the storage unit 4204 or one or more camera lenses 200 within the photography unit 4200 to capture or monitor the plurality of partial images. For the standby mode, the power supply unit 4208 merely provides the power for the wireless communication 4206 for wake-up mechanism. The above operation mode is to be enabled with the control command that is transmitted from the processing unit 4202 and the central processing module 4103, and by using the different operation mode to save the output of the power supply to extend the operation duration for the panoramic scene capturing device 42. But the operation mode of the panoramic scene capturing device 42 is not to be limited in the present invention.

Please still refer to FIG. 5. For the mobile device 41, the touch and display screen module 4101, the central processing module 4103, the wireless communication module 4109 and the memory module 4105 is communicated and electrically connected with each other. The central processing module 4103 is further electrically connected with the motion detecting module 4107. The touch and display screen module 4101 receives the touch signal of gestures such as slide, click and drag for generating the control signal to control the corresponding control instruction which is generated by the central processing module 4103. The control instruction such as select a specific camera for monitor, capture an image, record video, or browse the panoramic scene. In addition, the touch and display screen module 4101 further displays the image which is captured by the panoramic scene capturing device 42. The memory module 4105 is provided for storing the panoramic scene data and provides the required program for the central processing module 4103. The application 220 of the memory module 4105 composes the plurality of partial images with positioning data which is received from the panoramic scene capturing device 42 and the plurality of partial images with positioning data is further formed as a panoramic scene with the positioning data, in which the positioning data includes the direction data or the capturing viewing angle range. With aforementioned data, user can link the various images into a panoramic scene and to achieve a panoramic scene reality feeling browsing. After application is executed, the central processing module 1403 displays the panoramic scene with a specific viewing angle range of browsing on the touch and display screen module 4101 according to the viewing angle range data of the plurality of partial images of the panoramic scene. In which the specific viewing angle range of browsing such as left-right viewing angle range is about 200 degree and up-down viewing angle range is about 100 degree, and the specific viewing angle range is equal to or smaller than any one of viewing angle range which is captured by the any one of the plurality of camera lenses 200 of the panoramic scene capturing device 42. The motion detecting module 4107 detects the mobile device state for controlling the viewing angle range of the panoramic scene displayed on the mobile device 41, such that when the user browses the panoramic scene, the user seems itself is surrounded by the panoramic scene. When the user moves the mobile device 41 to the right, the viewing angle range can be extended toward right, and when the user moves the mobile device 41 to the left, the viewing angle range can be extended toward left. The changes in the viewing angle range is equivalent to that of in viewing angle range which is captured by any one of the plurality of camera lenses 200 of the headset panoramic scene capturing device 42. As a result, the purpose of the reality feeling browsing of the panoramic scene can be achieved.

The motion detecting module 4107 is provided for detecting the state change in the mobile device 41 when the external force is applied to the mobile device 41 and sensing signal of the changes in the state of the mobile device 41 is provided for the central processing module 4013 to send a corresponding control signal to the mobile device 41. The changes of the state of the mobile device 41 acceleration variation, angular velocity variation or X-axis, Y-axis, and Z-axis of gravity gradient variation. The motion detecting module 4107 further includes an accelerometer, a gravity meter and a gyroscope for detecting the changes in the position, posture, orientation for the rotation, shake or move of the mobile device 41, and the types of the detector for the motion detecting module 4017 is not limited in this present invention. The wireless communication module 4109 is provided for communicating the control instruction of the central processing module 4103 to the wireless communication unit 4206 of the panoramic scene capturing device 42 and the panoramic scene data is received by the wireless communication unit 4206. The central processing module 4103 sends a control instruction to the processing unit 4020 of the panoramic scene capturing device 42 and processes the plurality of partial images which is captured by the panoramic scene capturing device 42 to compose the plurality of partial images to form a panoramic scene. The central processing module 4103 can also receives the sensing signal from the motion detecting module 4107 to execute the application 220 within the memory module 4105 so as to adjust the viewing angle range of the panoramic scene browsing.

Figure 6:
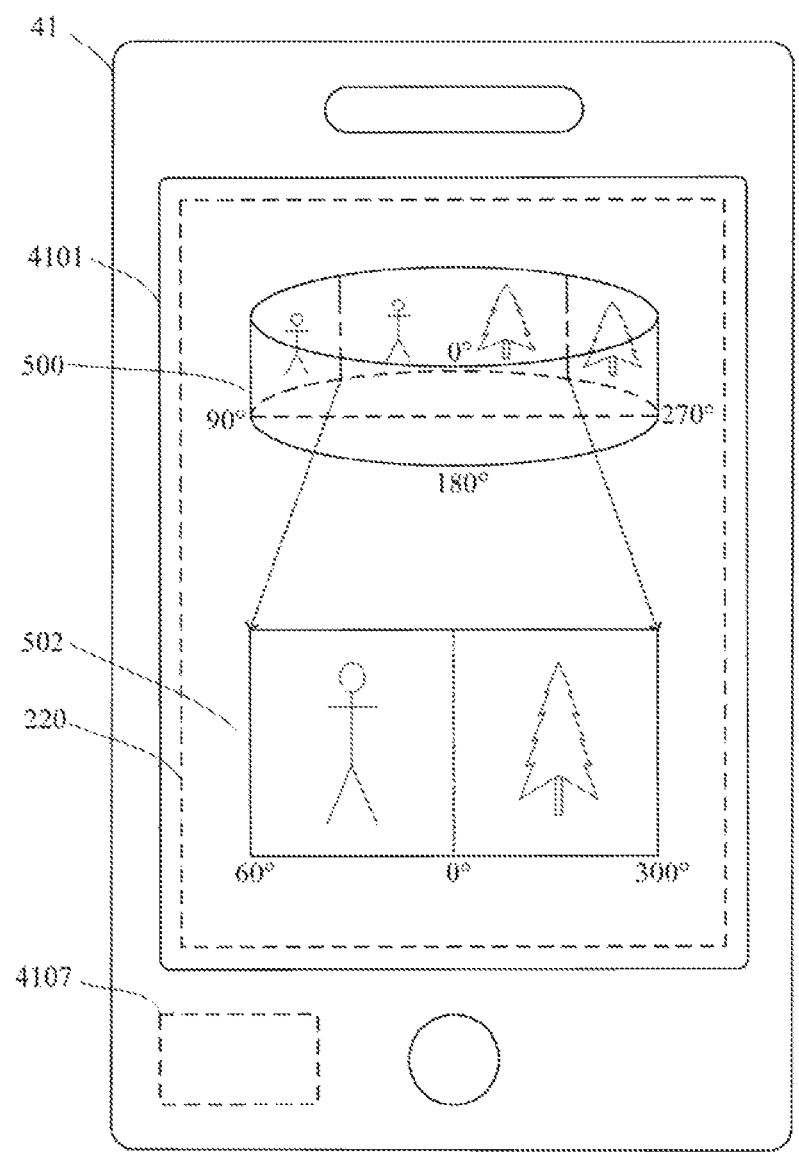
FIG. 6 is a schematic view of showing a first browsing statues of a application of the mobile device for the panoramic scene capturing and browsing system in accordance with the present invention.
Figure 7:
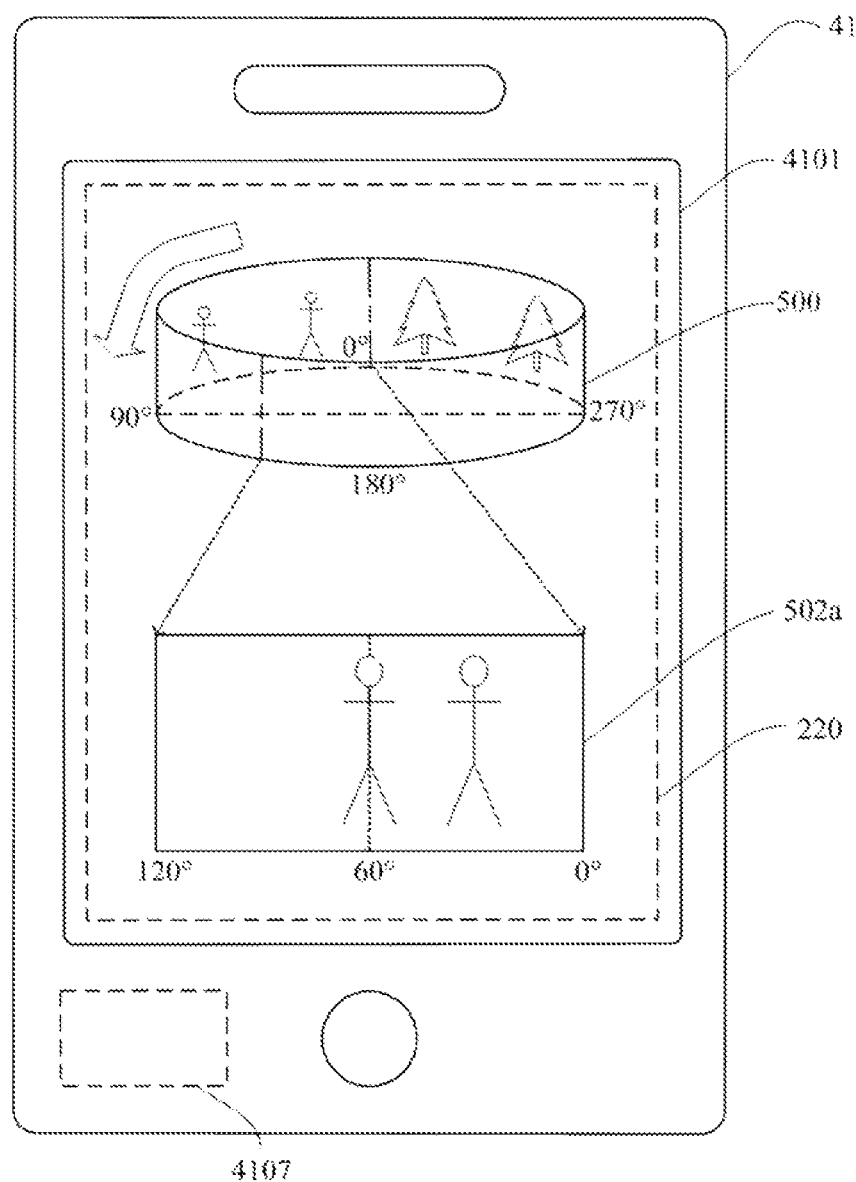
FIG. 7 is a schematic view of showing a second browsing statues of a application of the mobile device for the panoramic scene capturing and browsing system in accordance with the present invention.

Please refer to FIG. 6 and FIG. 7. FIG. 6 and FIG. 7 respectively show the schematic of first viewing status and second viewing status when the application of the mobile device is executed for the panoramic scene capturing and browsing system. As shown in FIG. 6, when the application 220 of the mobile device 41 of the panoramic scene capturing and browsing system 40 is provided for browsing the panoramic scene 500, a browsing viewing angle range 502 of the panoramic scene 500 is displayed on the touch and display screen module 4101 of the mobile device 41. The coordinate range of the browsing viewing angle range 502 is obtained according to the positioning data of the plurality of partial images which is captured by the headset panoramic scene capturing device 42. When the motion detecting module 4107 of the mobile device 41 detects the mobile device 41 that is moved to the left direction, another viewing angle range 502*a* of the panoramic scene is displayed on the touch and display screen module 4101 as shown in FIG. 7, in which the viewing angle range 502*a* relative to the viewing angle range 502 that is moved in counterclockwise and the deflection angle is corresponding to the detection amount of left movement of the mobile device 41.

In addition, with the expansion of camera lenses of the panoramic scene capturing device 42 can achieve the capable of 3D (three dimensional) panoramic scene capturing and browsing. In an embodiment, the plurality of camera lenses can be the four ultra-wide angle-lenses with a viewing angle of 120 degree, and the arrangement of the four ultra-wide angle lenses are adopted for the left and right sides viewing angle. As the embodiment in FIG. 4, the panoramic scene capturing device 42 equipped with the camera lens 200 can enable the users to generate a three-dimensional perspective and intuitive feeling for the aforementioned panoramic scene capturing and browsing system 40.

Figure 8:
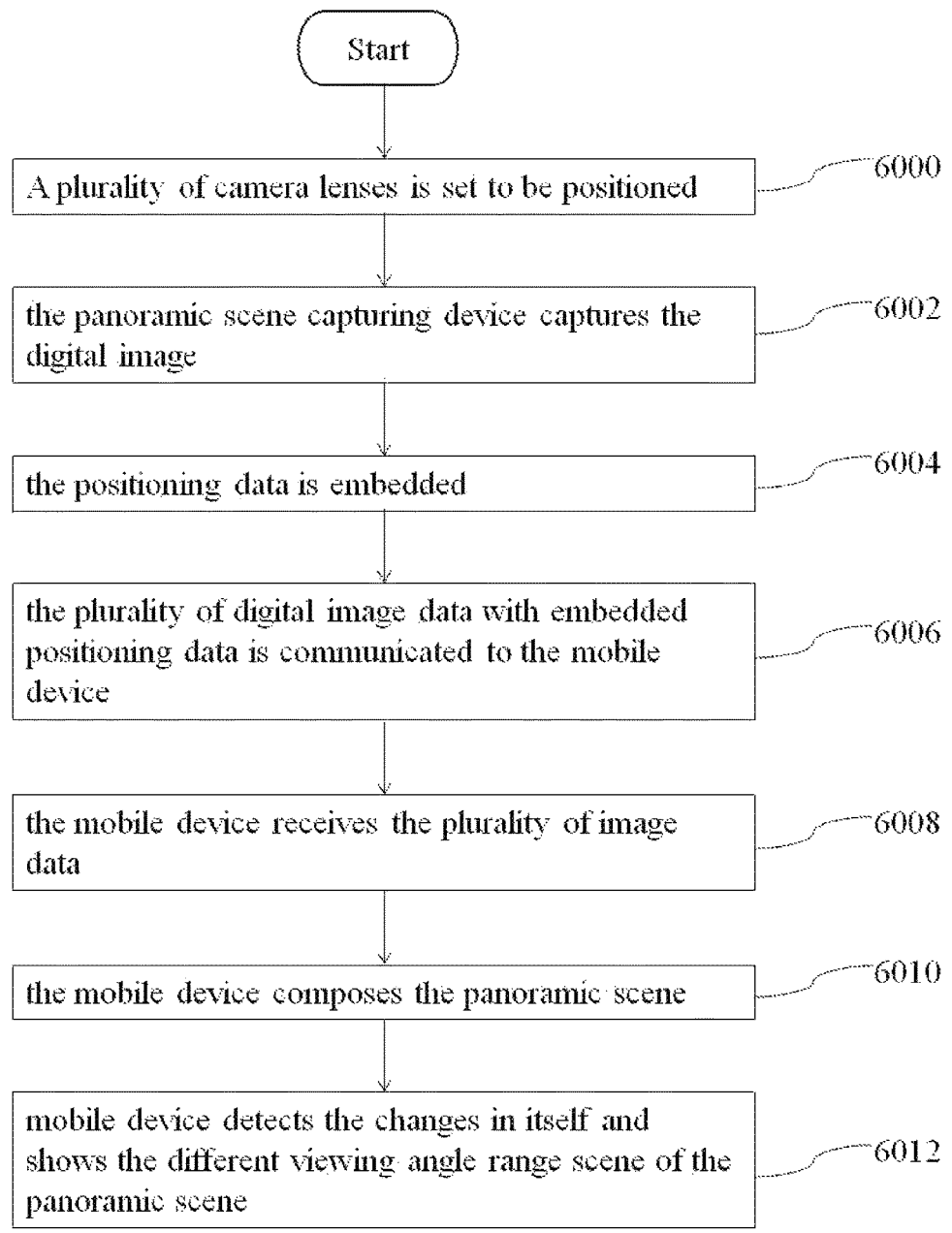
FIG. 8 is a flow chart for the panoramic scene capturing and browsing method in accordance with the present invention.
Figure 9:
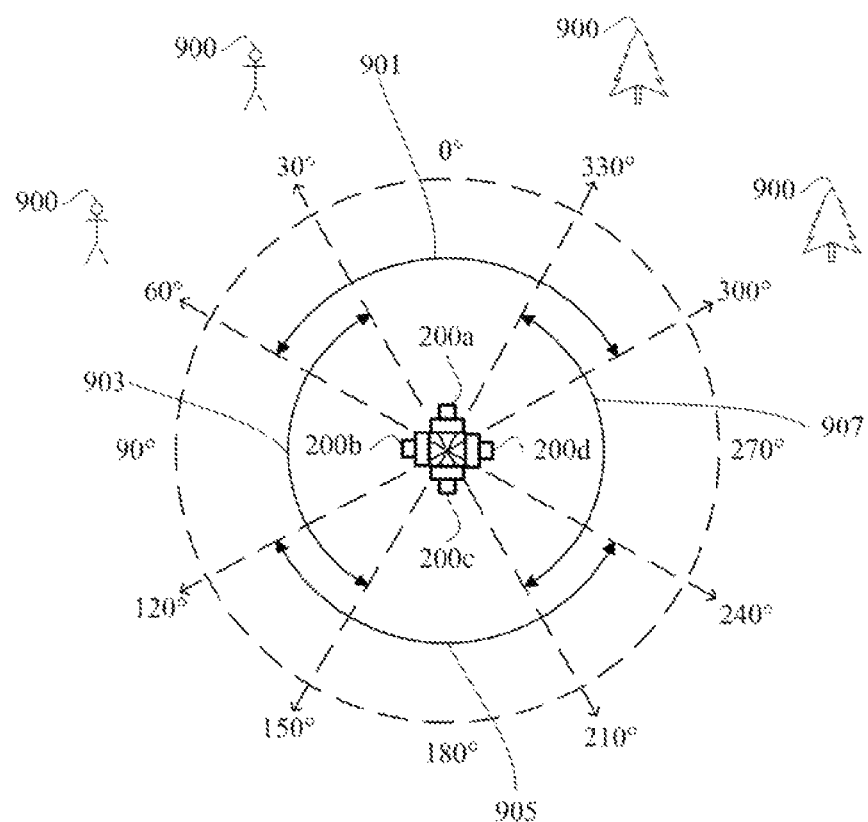
FIG. 9 is a schematic view of showing a viewing angle range of the photography device of the panoramic scene capturing and browsing system in accordance with the present invention.

Please refer to FIG. 8. FIG. 8 is a flow chart of the present invention utilizes the panoramic scene capturing device for panoramic scene capturing and browsing. As shown in FIG. 8, the panoramic scene capturing and browsing method is described as follows:

Step 6000: the plurality of camera lenses 200 is set to be positioned. User utilizes the touch and display screen module 4101 of mobile device 41 to browse the screen which is monitored by each camera lenses of the panoramic scene capturing device 42 so as to set the user browsing positioning data that is corresponding to each camera lenses. For example, please return to FIG. 3 and also refer to FIG. 9, which are schematic views of showing the viewing angle range of the panoramic scene capturing device 42. The plurality of camera lenses 200 of the panoramic scene capturing device 42 sets the photo intake lens 200*a* (front intake screen), the photo intake lens 200*b* (left intake screen), the photo intake lens 200*c* (back intake screen), and the photo intake lens 200*d* (right intake screen) according to the direction relationship between the plurality of scenes 900 which is captured by the plurality of camera lenses 200*a*~200*d*.

Step 6002: the panoramic scene capturing device captures the digital image in different positions to obtain a positioning data. In this step, the plurality of camera lenses of the panoramic scene capturing device 42 captures the digital image in different positions for the panoramic scene and obtains the plurality of partial images from the plurality of photography unit 4200. The plurality of partial images is converted into the plurality of digital image data by the analog-to-digital converter and the plurality of digital image data is stored in the storage unit 4204. Meanwhile, the positioning data is obtained by the plurality of camera lenses 200 and the positioning data includes the viewing angle range data and the positioning data of the plurality of camera lenses in aforementioned step 6000. Please refer to FIG. 9, the viewing angle range 901 of the camera lens 200*a* is a viewing region of 300 degree to 60 degree in the panoramic scene angle range, the viewing angle range 903 of the camera lens 200*b* is a viewing region of 30 degree to 150 degree in the panoramic scene angle range, the viewing angle range of camera lens 200*c* is a viewing region of 120 degree to 240 degree, and the viewing angle range of camera lens 200*d* is a viewing region of 210 degree to 330 degree. As a result, the panoramic scene angle range includes the overlapped viewing angle range of 30 degree to 60 degree in the middle of the camera lens 200*a* and 200*b*. The positioning data such as aforementioned viewing angle range of camera lenses 200*a*~200*d* and the overlapped viewing angle range are provided for overlapping the plurality of digital image data for the composed panoramic scene.

Step 6004: the positioning data is embedded. The processing unit 4202 embeds the positioning data for the plurality of camera lenses 200*a*~200*d* into each corresponding plurality of image data according to the plurality of digital image data is captured by the plurality of camera lenses 200 which is stored in the storage unit 4202 and the positioning data of each the plurality of camera lenses 200 corresponding to the user itself position data, in which the positioning data includes viewing angle range data and the user itself visual positioning data (for example, front, left, back, and right are defined as 1, 2, 3, and 4 for composing the panoramic scene).

Step 6006: the plurality of digital image data with embedded positioning data is communicated to the mobile device. The plurality of digital image data with embedded positioning data stored in the storage unit 4204 is communicated to the mobile device 41 through the wireless communication unit 4206 which is controlled by the processing unit 4202.

Step 6008: the mobile device 41 receives the plurality of image data with embedded positioning data. The wireless communication module 4109 of the mobile device 41 receives the plurality of image data with the embedded positioning data which is communicated by the wireless communication unit 4206 of the panoramic scene capturing device 42 and then the plurality of image data with the embedded positioning data is stored in the memory module 4105 by the central processing module 4103.

Step 6010: the mobile device composes the panoramic scene with positioning data and displays thereon. The central processing module 4103 of the mobile device generates a specific positioning data especially for composed panoramic scene with embedded positioning data according to the plurality of digital image data with embedded positioning data which is composed by the application 220 of the memory module 4105. As the panoramic scene 500 in FIG. 6, the application 220 processes the panoramic scene reality feeling browsing function to display a viewing angle range scene 502 of a fixed front viewing angle range on the touch and display screen module 4101. The coordinate range of the viewing angle range scene 502 of the panoramic scene 500 is obtained from the positioning data of the plurality of partial images particularly to the viewing angle range data which is captured by the panoramic scene capturing device 42.

Step 6012: mobile device 41 detects the changes in itself and shows the different viewing angle range scene of the panoramic scene. The central processing module 4103 of the mobile device 41 detects the state changes which is generated by applying the external force to the mobile device 41 according to the detector of the motion detecting module 4107, the state changes includes the acceleration variation, angular velocity variation or X-axis, Y-axis, and Z-axis of gravity gradient variation. The detecting module includes the change types of the position, posture, orientation for the rotation, shake or movement of the mobile device 41 which is detected by the analog-to-digital convertor of the motion detecting module 4107 to generate a digital sensing signal. In addition, with the digital sensing signal from the motion detecting module 4107, the central processing module 4103 of the mobile device 41 calculates the central coordinate displacement value of the viewing angle range scene 502 of the panoramic scene by the displacement calculation function of application 220 of the memory module 4105. Moreover, for the central processing module 4103 of the mobile device 41, the application 220 of the memory module 4105 enables the reality feeling browsing function for the panoramic scene 500 and by the central coordinate displacement value, the central processing module 4103 of the mobile device 41 makes the viewing angle range scene 502 of the panoramic scene 500 to produce the corresponding displacement so as to another viewing angle range scene 502*a* of the panoramic scene 500 is to be browsed to provide reality scene directly.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A mobile device in communication with a photography device to capture and browse a composed panoramic scene, comprising:
    a touch and display screen module;
    a memory module;
    a motion detecting module to detect a state of the mobile device; and
    a central processing module connected with the touch and display screen module and the memory module via a transmission interface, and is electrically connected with the motion detecting module to execute the application to generate the composed panoramic scene by composing a plurality of partial images captured by the photography device according to a positioning data corresponding to the plurality of partial images;
    wherein the touch and display screen module displays the composed panoramic scene within a viewing angle range of browsing according to the state of the mobile device.

2. The mobile device of claim 1, wherein the photography device has a plurality of camera lenses.

3. The mobile device of claim 2, wherein the plurality of camera lenses are disposed on a carrier being adapted to human head.

4. The mobile device of claim 1, wherein the photography device further has a processing unit to generate the positioning data corresponding to the plurality of partial images, and the positioning data includes at least a viewing angle range of capturing the plurality of partial images.

5. The mobile device of claim 4, wherein the viewing angle range of browsing for displaying the composed panoramic scene on the touch and display screen module is less than or equal to the viewing angle range of capturing the plurality of partial images.

6. The mobile device of claim 1, further comprising:
    a wireless communication module electrically connected to the central processing module to construct a wireless communication between the mobile device and the photography device, wherein the wireless communication module is in compliance with Bluetooth, Bluetooth Low Energy, Wi-Fi or 3G mobile communication protocol.

7. The mobile device of claim 1, wherein the motion detecting module includes an accelerometer, a gravity meter or a gyroscope, wherein the state of the mobile device includes variation of acceleration, angular velocity or gravity gradient.

8. A panoramic scene capturing and browsing system, comprising:
a photography device including a plurality of camera lenses, each of the camera lenses respectively captures a partial image, the photography device generates a positioning data corresponding to the plurality of partial images; and
a mobile device including a motion detecting module to detect a state of the mobile device, the mobile device is in communication with the photography device with a community connection to control the photography device;
wherein the mobile device receives the plurality of partial images and the positioning data to generate a composed panoramic scene, the mobile device displays the composed panoramic scene within a viewing angle range of browsing according to the state of the mobile device.

9. The panoramic scene capturing and browsing system of claim 8, wherein the camera lenses are disposed on a carrier being adapted to human's head.

10. The panoramic scene capturing and browsing system of claim 8, wherein the positioning data includes a viewing angle range of capturing the plurality of partial images.

11. The panoramic scene capturing and browsing system of claim 10, wherein the viewing angle range of browsing for displaying the composed panoramic scene on the mobile device is less than or equal to the viewing angle range of capturing the plurality of partial images.

12. The panoramic scene capturing and browsing system of claim 10, wherein the viewing angle range of capturing the plurality of partial images is 60 degree~220 degree horizontally.

13. The panoramic scene capturing and browsing system of claim 10, wherein the viewing angle range of capturing the plurality of partial images is 60 degree~120 degree vertically.

14. The panoramic scene capturing and browsing system of claim 8, wherein the motion detecting module includes an accelerometer, a gravity meter or a gyroscope, wherein state of the mobile device includes variation of acceleration, angular velocity or gravity gradient.

15. The panoramic scene capturing and browsing system of claim 8, wherein the mobile device community is in communication with the photography device with a wireless communication.

16. The panoramic scene capturing and browsing system of claim 15, wherein the wireless communication is in compliance with Bluetooth, Bluetooth Low Energy, Wi-Fi or 3G mobile communication protocol.

17. A panoramic scene capturing method utilized by a mobile device, comprising:
capturing a plurality of images corresponding to different directions, and obtaining a positioning data corresponding to the plurality of images;
composing the plurality of images to generate a composed panoramic scene according to the positioning data; and
displaying the composed panoramic scene by the mobile device within a viewing angle range of browsing set according to a state of the mobile device.

18. The panoramic scene capturing method of claim 17, wherein the positioning data includes at least a viewing angle range of capturing the plurality of partial images.

19. The panoramic scene capturing method of claim 18, wherein the viewing angle range of browsing is less than or equal to the viewing angle range of capturing the plurality of partial images.

20. The panoramic scene capturing method of claim 17, wherein the state includes variation of acceleration, angular velocity or gravity gradient.

* * * * *